US012444776B2

(12) United States Patent
Zhou et al.

(10) Patent No.: US 12,444,776 B2
(45) Date of Patent: Oct. 14, 2025

(54) BATTERY CLUSTER MANAGEMENT DEVICE AND BATTERY ENERGY STORAGE SYSTEM

(71) Applicant: Sungrow Power Supply Co., Ltd., Hefei (CN)

(72) Inventors: Jianjie Zhou, Hefei (CN); Qingqing Xu, Hefei (CN); Hui Tong, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 865 days.

(21) Appl. No.: 17/529,946

(22) Filed: Nov. 18, 2021

(65) Prior Publication Data

US 2022/0166072 A1 May 26, 2022

(30) Foreign Application Priority Data

Nov. 23, 2020 (CN) .......................... 202011322706.1

(51) Int. Cl.
*H02M 1/36* (2007.01)
*H01M 10/42* (2006.01)

(52) U.S. Cl.
CPC ..... *H01M 10/425* (2013.01); *H01M 10/4207* (2013.01); *H02M 1/36* (2013.01); *H01M 2010/4271* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 5,214,385 A * 5/1993 Gabriel ............ G01R 19/16542
324/426
5,498,950 A * 3/1996 Ouwerkerk ............. B60L 58/15
320/152
(Continued)

FOREIGN PATENT DOCUMENTS

CN 102447285 A 5/2012
CN 202712883 U 1/2013
(Continued)

OTHER PUBLICATIONS

First Office Action dated Sep. 27, 2022 in connection with Chinese Application No. 202011322706.1.
(Continued)

*Primary Examiner* — Sean Kayes
*Assistant Examiner* — Nusrat Quddus
(74) *Attorney, Agent, or Firm* — Wolf, Greenfield & Sacks, P.C.

(57) ABSTRACT

A battery cluster management device and a battery energy storage system are provided. The battery cluster management device includes a networking circuit and an integrated controller, a connecting circuit of the networking circuit and a power conversion circuit connected in series, the integrated controller is respectively connected to the connecting circuit, the power conversion circuit, and a BMU in a battery cluster, and the integrated controller is configured to: perform a preset battery management process according to preset electrical information fed back by the connecting circuit and the BMU, and control the power conversion circuit to perform a preset current conversion process. In the present disclosure, the connecting circuit and the power conversion circuit are integrated, thus repeated voltage and current detection circuits and corresponding soft start circuits are unnecessary, the integration level of the battery
(Continued)

cluster management device is improved effectively, and the overall cost is reduced.

16 Claims, 7 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H05B 39/048; B23K 11/24; H04B 2215/069; Y02B 70/1491; H02J 3/46; H02J 3/38; G01R 19/165; G01R 19/16504; G01R 19/16509; G01R 19/16514; G01R 19/16519; G01R 19/16523; G01R 19/16528; G01R 19/16533; G01R 19/16538; G01R 19/16542; G01R 19/16547; G01R 19/16552; G01R 19/16557; G01R 19/16561; G01R 19/16566; G01R 19/16571; G01R 19/16576; G01R 19/1658; G01R 19/16585; G01R 19/1659; G01R 19/16595; G01R 19/17

See application file for complete search history.

(56) References Cited

U.S. PATENT DOCUMENTS

| | | | |
|---|---|---|---|
| 5,670,861 A * | 9/1997 | Nor | H02J 7/0016 340/636.15 |
| 6,274,950 B1 * | 8/2001 | Gottlieb | G01R 31/3648 307/66 |
| 10,246,035 B2 * | 4/2019 | Schaeffer | F02N 11/0866 |
| 2014/0285936 A1 * | 9/2014 | Garbacik | B60L 58/15 361/88 |
| 2014/0292259 A1 | 10/2014 | Kim et al. | |
| 2014/0347013 A1 * | 11/2014 | Kim | G01R 31/382 320/134 |
| 2015/0200559 A1 * | 7/2015 | Im | H02J 7/0029 307/18 |
| 2016/0241057 A1 * | 8/2016 | Yang | H02J 9/062 |
| 2017/0070073 A1 * | 3/2017 | Mohammed | H01M 10/486 |
| 2021/0036544 A1 * | 2/2021 | Cao | G06F 1/30 |
| 2022/0126726 A1 * | 4/2022 | Kim | G01R 31/54 |
| 2022/0173451 A1 * | 6/2022 | Zhou | H01M 10/635 |
| 2023/0170711 A1 * | 6/2023 | Wang | H02J 7/00304 320/118 |
| 2023/0335995 A1 * | 10/2023 | Brooker | H02J 3/322 |
| 2023/0344235 A1 * | 10/2023 | Wu | H02J 7/02 |
| 2023/0387684 A1 * | 11/2023 | Hall | H02J 3/004 |
| 2023/0420948 A1 * | 12/2023 | Zhang | H01M 10/425 |
| 2023/0420956 A1 * | 12/2023 | Wu | H02J 7/0016 |
| 2023/0420972 A1 * | 12/2023 | Liu | B60L 1/00 |
| 2024/0014667 A1 * | 1/2024 | Wu | H02J 7/0019 |
| 2024/0022077 A1 * | 1/2024 | Yu | H02J 9/06 |
| 2024/0030724 A1 * | 1/2024 | Li | H01M 10/44 |
| 2024/0088697 A1 * | 3/2024 | Zhou | H02J 7/0031 |
| 2024/0131945 A1 * | 4/2024 | Sane | H02J 7/0048 |
| 2024/0213786 A1 * | 6/2024 | Chen | H02J 7/00306 |

FOREIGN PATENT DOCUMENTS

| | | | |
|---|---|---|---|
| CN | 106505605 A | | 3/2017 |
| CN | 107086564 A | | 8/2017 |
| CN | 109755948 A | | 5/2019 |
| CN | 110687864 A | | 1/2020 |
| CN | 110690721 A | | 1/2020 |
| CN | 110716150 A | | 1/2020 |
| CN | 110912235 A | | 3/2020 |
| CN | 110943483 A | | 3/2020 |
| CN | 111509317 A | | 8/2020 |
| CN | 111817864 A | | 10/2020 |
| EP | 3588728 A1 * | 1/2020 | ........ H01M 10/4207 |

OTHER PUBLICATIONS

Second Office Action for Chinese Application No. 202011322706.1, dated May 5, 2023.
EP21209250.6, May 3, 2022, Extended European Search Report.
Extended European Search Report for European Application No. 21209250.6, dated May 3, 2022.

* cited by examiner

BATTERY CLUSTER MANAGEMENT DEVICE AND BATTERY ENERGY STORAGE SYSTEM

The present application claims priority to Chinese Patent Application No. 202011322706.1, titled "BATTERY CLUSTER MANAGEMENT DEVICE AND BATTERY ENERGY STORAGE SYSTEM", filed on Nov. 23, 2020 with the China National Intellectual Property Administration, which is incorporated herein by reference in its entirety.

FIELD

The present disclosure relates to the technical field of power supply, and in particular, to a battery cluster management device and a battery energy storage system.

BACKGROUND

Reference is made to FIG. 1, which is a structural block diagram of a battery energy storage system in the conventional technology. The battery energy storage system includes multiple battery clusters (which are shown in FIG. 1 as battery cluster 1, battery cluster 2 . . . battery cluster n). After each of the multiple battery clusters is connected to a switch gear (SG) respectively, it is connected to a direct current to direct current (DC-DC) converter respectively for DC voltage conversion. Then the multiple battery clusters are connected to a battery collection panel (BCP) for current confluence, and to a DC side of a power conversion system (PCS) for power conversion. After a DC voltage is converted to an alternating current (AC) voltage, it is transmitted to a power supply network through a step-up transformer.

In the battery energy storage system, a battery cluster management unit (CMU) is integrated in the SG, and is configured to detect a DC voltage and a DC current of a battery cluster, control the battery cluster to be on and off, and perform a soft start operation. In some cases, the SG, the DC-DC converter, and the PCS in the battery energy storage system are provided by different suppliers. Hence, the DC-DC converter or the DC side of the PCS in the battery energy storage system is also provided with circuits for detecting the DC voltage and the DC current and performing the soft start operation.

Therefore, excessive repetitive design exists in the switch gear and converter equipment such as the DC-DC converter or the PCS in the battery energy storage system, resulting in a large number of components of the battery energy storage system, low system integration, and high cost.

SUMMARY

A battery cluster management device and a battery energy storage system are provided according to embodiments of the present disclosure, which integrates multiple functional circuits and control units corresponding to the multiple functional circuits together to improve the integration level of the battery cluster management device, thereby increasing the integration level of the battery energy storage system and reducing the cost.

To achieve the above objective, following technical solutions are provided.

In a first aspect, a battery cluster management device is provided in the present disclosure, and the battery cluster management device includes a networking circuit and an integrated controller. The networking circuit includes a connecting circuit and a power conversion circuit connected in series. The integrated controller is connected to the connecting circuit, the power conversion circuit, and a battery management unit (BMU) in a battery cluster, respectively. The integrated controller is configured to: perform a preset battery management process according to preset electrical information fed back by the connecting circuit and the BMU, and control the power conversion circuit to perform a preset current conversion process.

In an embodiment, the power conversion circuit includes a direct current to alternating current (DC-AC) circuit or a direct current to direct current (DC-DC) circuit.

In an embodiment, in case that the power conversion circuit includes the DC-DC circuit, the connecting circuit includes a first direct current (DC) connecting circuit and a second DC connecting circuit. The first DC connecting circuit is connected in series between the battery cluster and the DC-DC circuit, the second DC connecting circuit is connected in series between the DC-DC circuit and a DC-AC conversion device, and the first DC connecting circuit and the second DC connecting circuit are connected with the integrated controller, respectively.

In an embodiment, the first DC connecting circuit includes a first soft start circuit and a first connection sampling circuit, the first soft start circuit is connected in series between the first connection sampling circuit and the DC-DC circuit, and the first connection sampling circuit is connected with the battery cluster and the integrated controller, respectively. The second DC connecting circuit includes a second soft start circuit and a second connection sampling circuit, the second soft start circuit is connected in series between the DC-DC circuit and the second connection sampling circuit, and the second connection sampling circuit is connected with the DC-AC conversion device and the integrated controller, respectively.

In an embodiment, the integrated controller includes a battery cluster management unit (CMU) and a DC-DC control unit.

In an embodiment, in case that the power conversion circuit includes a DC-AC circuit, the connecting circuit includes a third direct current (DC) connecting circuit and an alternating current (AC) connecting circuit. The third DC connecting circuit is connected in series between the battery cluster and the DC-AC circuit, the AC connecting circuit is connected in series between the DC-AC circuit and an AC confluence device, and the third DC connecting circuit and the AC connecting circuit are connected with the integrated controller, respectively.

In an embodiment, the third DC connecting circuit includes a third soft start circuit and a third connection sampling circuit. The third soft start circuit is connected in series between the third connection sampling circuit and the DC-AC circuit, and the third connection sampling circuit is connected with the battery cluster and the integrated controller, respectively.

In an embodiment, the integrated controller includes a battery cluster management unit (CMU) and a DC-DC control unit.

In a second aspect, a battery energy storage system is provided in the present disclosure, and the battery energy storage system includes at least one battery cluster, a confluence bus, a direct current to alternating current (DC-AC) conversion device, and at least one aforementioned battery cluster management device. The at least one battery cluster is connected with the at least one battery cluster management device, the at least one battery cluster management device is connected with the DC-AC conversion device via the confluence bus, and the DC-AC conversion device is connected with a power supply network.

In an embodiment, the DC-AC conversion device includes a DC-AC circuit and a main controller. The main controller is connected with the DC-AC circuit, and the main controller is configured to: control the DC-AC circuit to perform the preset current conversion process and a preset power control process.

In an embodiment, the battery energy storage system further includes a step-up transformer, and the DC-AC conversion device is connected with the power supply network through the step-up transformer.

In a third aspect, a battery energy storage system is provided in the present disclosure, and the battery energy storage system includes at least one battery cluster, an alternating current (AC) confluence device, and at least one aforementioned battery cluster management device. The at least one battery cluster is connected with the at least one battery cluster management device, the at least one battery cluster management device is connected with the AC confluence device, and the AC confluence device is connected with a power supply network.

In an embodiment, the AC confluence device includes a confluence circuit and a main controller. The main controller is connected with the confluence circuit, and the main controller is configured to control the confluence circuit to perform a preset current confluence process and a preset power control process.

In an embodiment, the battery energy storage system further includes a step-up transformer, and the AC confluence device is connected with the power supply network through the step-up transformer.

A battery cluster management device is provided according to embodiments of the present disclosure. The battery cluster management device includes a networking circuit and an integrated controller; a connecting circuit of the networking circuit is connected in series with a power conversion circuit of the networking circuit; the integrated controller is connected to the connecting circuit, the power conversion circuit, and a battery management unit (BMU) in a battery cluster, respectively; and the integrated controller is configured to: perform a preset battery management process according to preset electrical information fed back by the connecting circuit and the BMU, and control the power conversion circuit to perform a preset current conversion process. In the battery cluster management device provided by the present disclosure, the connecting circuit and the power conversion circuit are integrated and produced by one manufacturer, thus repeated voltage and current detection circuits and corresponding soft start circuits are unnecessary, the integration level of the battery cluster management device is improved effectively, and the integration level of the battery energy storage system is increased, thereby reducing the overall cost.

In addition, compared with one controller with one independent control function used in the conventional technology, the integrated controller of the device has multiple control functions in one controller, thus the number of controllers is reduced, the communication between controllers is effectively reduced, thereby reducing the communication time of the battery energy storage system and improving the response speed to the power supply network.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. It is apparent that the drawings in the following description show only some embodiments of the present disclosure, and other drawings may be obtained by those skilled in the art from the drawings without any creative work.

DETAILED DESCRIPTION OF EMBODIMENTS

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

Figure 1:
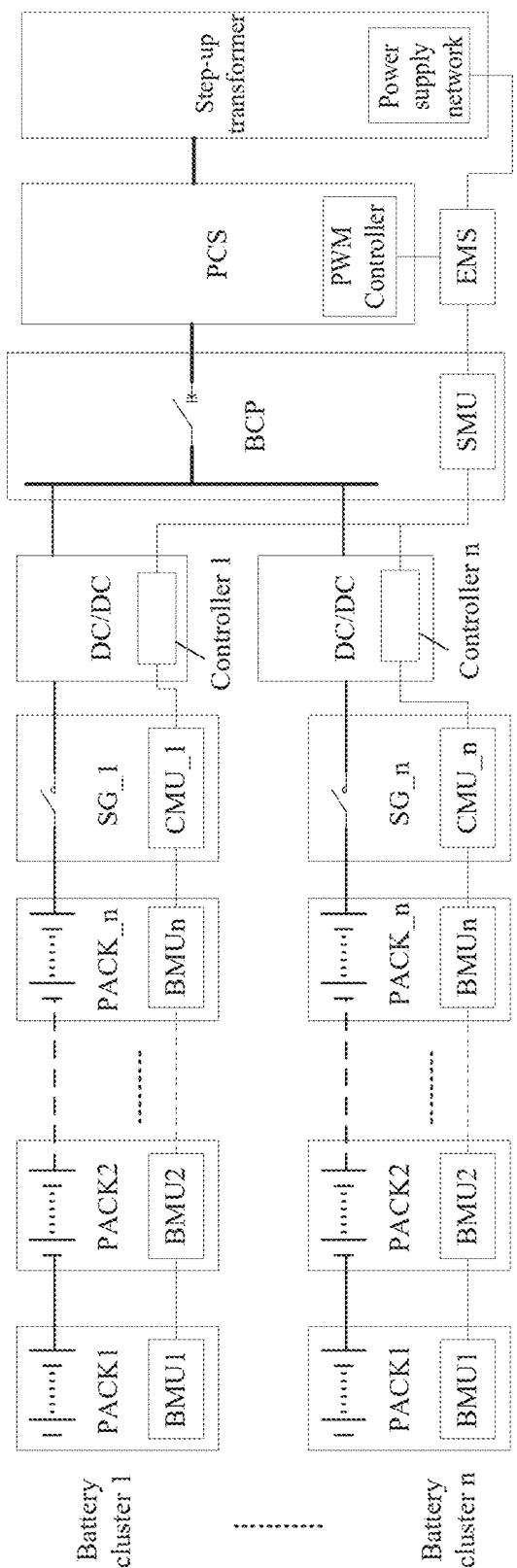
FIG. 1 is a structural block diagram of a battery energy storage system in the conventional technology.
Figure 2:
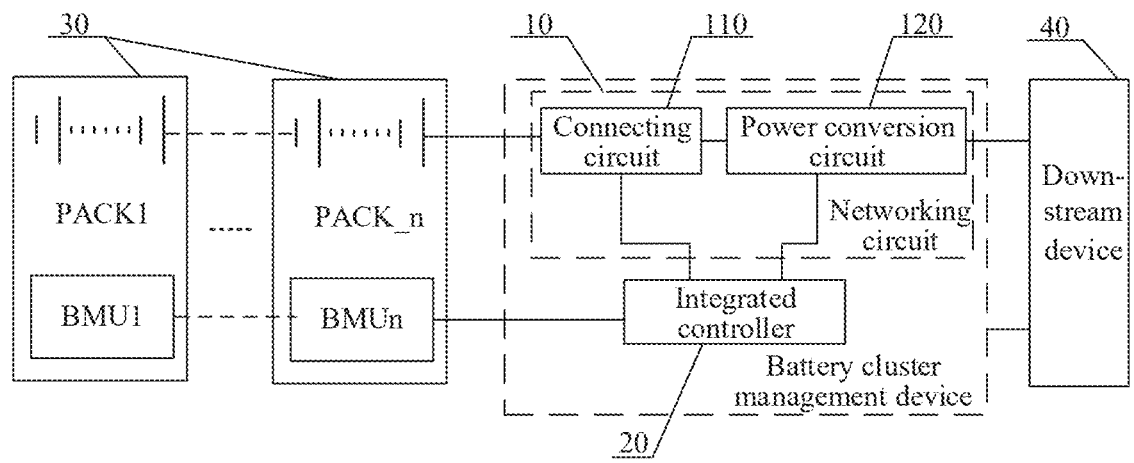
FIG. 2 is a structural block diagram of a battery cluster management device according to an embodiment of the present disclosure.

Reference is made to FIG. 2, which is a structural block diagram of a battery cluster management device according to an embodiment of the present disclosure. The battery cluster management device includes a networking circuit 10 and an integrated controller 20. The networking circuit 10 includes a connecting circuit 110 and a power conversion circuit 120. The connecting circuit 110 is connected in series with the power conversion circuit 120, to form a loop for transmitting electric power between a battery cluster 30 and a downstream device 40. Specifically, the battery cluster 30 is connected with the connecting circuit 110, the connecting circuit 110 is connected with the power conversion circuit 120, and the power conversion circuit 120 is connected with the downstream device 40.

In combination with the conventional arrangement of the battery energy storage system in the conventional technology, the downstream device 40 in embodiments of the present disclosure may be an electrical device for current confluence, or an electrical device for converting direct current (DC) to alternating current (AC), etc. The specific selection of the downstream device 40 is not limited, and any electrical device that can enable the corresponding battery energy storage system to achieve predetermined functions may be selected.

The connecting circuit 110 and the power conversion circuit 120 are respectively connected with the integrated controller 20, and the integrated controller 20 is also connected with a battery management unit (BMU) in the battery cluster 30. The connecting circuit 110 is configured to realize communication between the battery cluster 30 and the power conversion circuit 120, and the power conversion circuit 120 is mainly used for current conversion. The connecting circuit 110, the power conversion circuit 120, and the BMU in the battery cluster 30 connected to the battery cluster management device will all feed back preset electrical information, such as voltage information, current information, etc., to the integrated controller 20. It should be noted that, in each embodiment of the present disclosure, information interaction between the integrated controller 20 and the BMU in the battery cluster 30 can be implemented with reference to the conventional technology, which will not be described in detail herein.

Based on the foregoing connection relationship and the information interaction relationship between the various components in the battery cluster management device, the integrated controller 20 provided in the embodiment of the present disclosure is mainly used to perform a preset battery management process according to the preset electrical information fed back by the connecting circuit 110 and the BMU, and the integrated controller 20 is also used to control the power conversion circuit 120 to perform a preset current conversion process. The preset battery management process mentioned in embodiments of the present disclosure includes, but is not limited to, a battery cluster DC voltage detection process, a battery cluster DC current detection process, and a calculation process for battery cluster state information, such as a state of charge (SOC), a state of energy (SOE), and a state of health (SOH). Furthermore, the integrated controller 20 is configured to: protect the battery cluster according to the preset electrical information, control the on and off of the battery cluster and a soft start of the battery cluster. It is conceivable that other battery management processes in the conventional technology are also included in the scope of the preset battery management process mentioned in embodiments of the present disclosure. The preset current conversion process may be a direct current to direct current (DC-DC) conversion process or a direct current to alternating current (DC-AC) conversion process, and it also includes other auxiliary processes in a process of realizing current conversion, which will not be described in detail herein.

In summary, in the battery cluster management device provided in the embodiments of the present disclosure, the connecting circuit has functions similar to a switch box in the conventional technology, and the power conversion circuit is similar to the power conversion circuit in the conventional technology. The integrated controller combines the battery management function with the current conversion function, while the two functions are respectively completed by independent controllers in the conventional technology. The connecting circuit and the power conversion circuit are integrated and produced by one manufacturer, so that repeated voltage and current detection circuits and corresponding soft start circuits are unnecessary, and reuse of power distribution protection units, such as fuses and DC relays, is realized. Therefore, the integration degree of the battery cluster management device is improved, the integration degree of the battery energy storage system is improved, and the overall cost is reduced.

Compared with the conventional technology of one controller with one independent control function, the integrated controller in embodiments of the present disclosure has multiple control functions in one controller. Thus the number of controllers is reduced, the communication between the controllers is effectively reduced, the communication time of the battery energy storage system is reduced, and the response speed of the device to dispatching commands from the power grid is improved.

The power conversion circuit may be a DC-AC circuit, or a DC-DC circuit. In view of these two situations, the present disclosure provides different specific embodiments. The optional components of the battery cluster management device in these two situations are introduced below.

Figure 3:
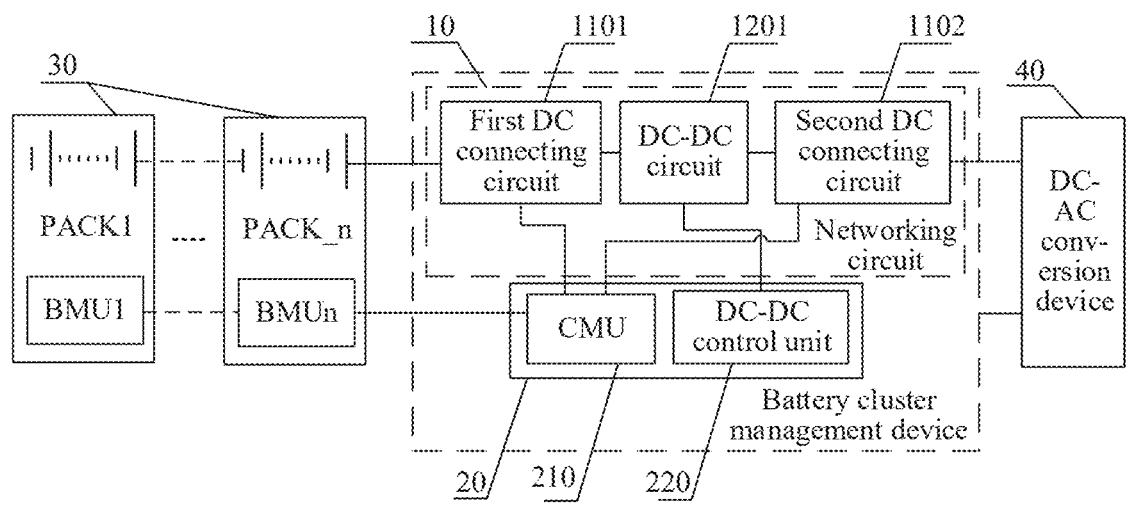
FIG. 3 is a structural block diagram of a battery cluster management device according to another embodiment of the present disclosure.

Reference is made to FIG. 3, which is a structural block diagram of a battery cluster management device according to an embodiment of the present disclosure. On the basis of the embodiment shown in FIG. 2, this embodiment respectively provides configurations of the networking circuit and the integrated controller when the power conversion circuit is a DC-DC circuit. In this embodiment, since the type of the power conversion circuit has been selected, the downstream device 40 described in the embodiment shown in FIG. 2 is a DC-AC conversion device 40 in this embodiment, and the specific structure thereof will be described in detail hereinafter.

Specifically, the connecting circuit 110 includes a first DC connecting circuit 1101 and a second DC connecting circuit 1102. The power conversion circuit 120 is a DC-DC circuit 1201 in the embodiment of the present disclosure. The first DC connecting circuit 1101 is connected in series between the battery cluster 30 and the DC-DC circuit 1201, and the second DC connecting circuit 1102 is connected in series between the DC-DC circuit 1201 and the DC-AC conversion device 40. Both the first DC connecting circuit 1101 and the second DC connecting circuit 1102 are connected to the integrated controller 20.

The integrated controller 20 includes a battery cluster management unit (CMU) 210 and a DC-DC control unit 220. The first DC connecting circuit 1101 and the second DC connecting circuit 1102 are respectively connected to the CMU 210, the DC-DC circuit 1201 is connected to the DC-DC control unit, and the CMU 210 is connected to a BMU in the battery cluster 30.

The first DC connecting circuit 1101 and the second DC connecting circuit 1102 are mainly configured to control the connection and disconnection between the DC-DC circuit 1201 and the battery cluster 30, and the DC-DC circuit 1201 and the DC-AC conversion device 40, respectively. The DC-DC circuit 1201 is mainly used for current conversion. The first DC connecting circuit 1101 and the second DC connecting circuit 1102 are also configured to feed back preset electrical information to the integrated controller 20 like the BMU in the battery cluster 30.

In the battery cluster management device provided by the embodiment in FIG. 3, a circuit of the conventional switch box and a basic circuit of the conventional DC-DC converter are integrated, and corresponding control functions of the above two are integrated into the integrated controller, thereby effectively improving the integration degree of the battery cluster management device and the integration degree of the battery energy storage system.

Figure 4:
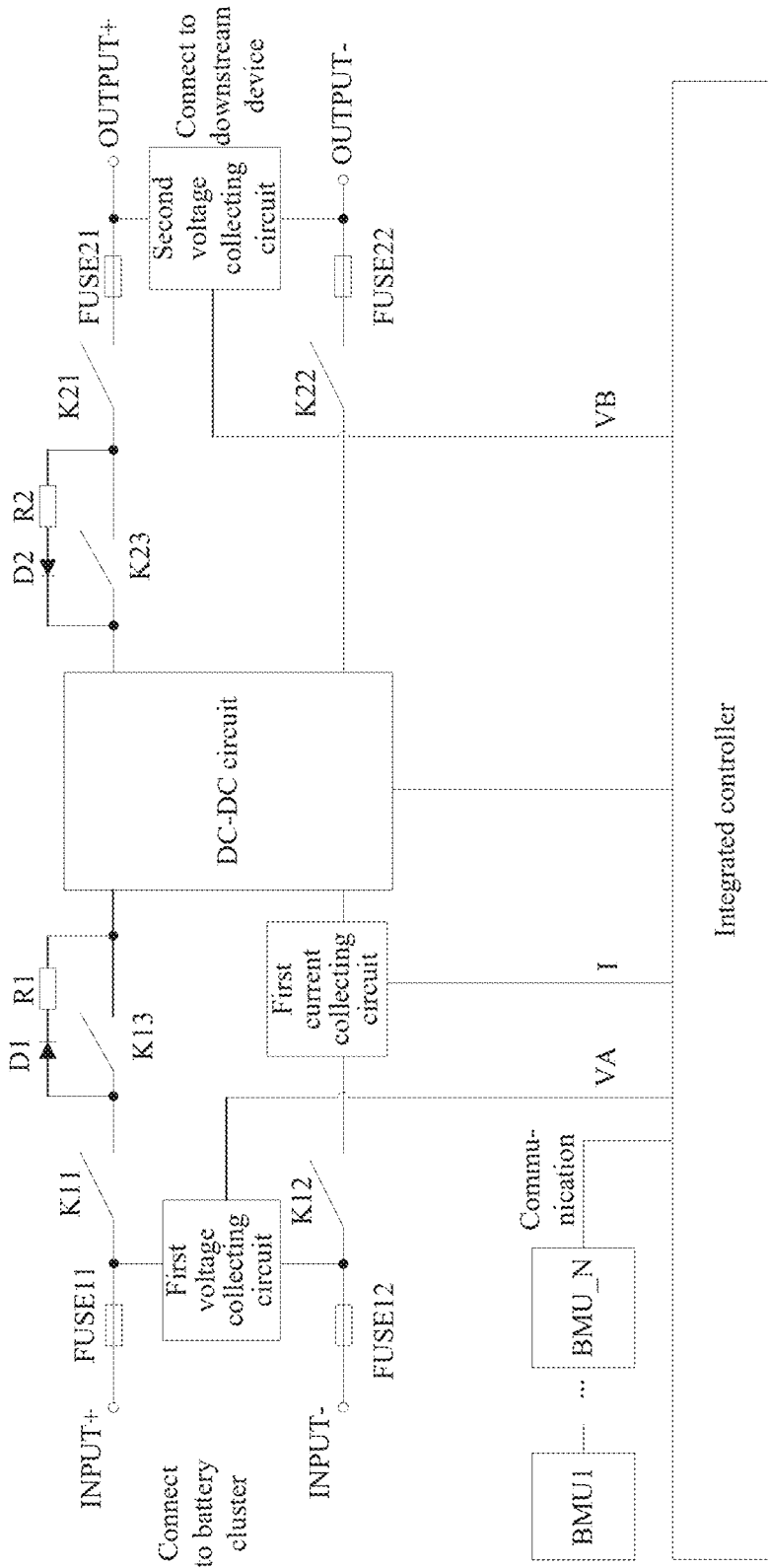
FIG. 4 is a structural block diagram of a battery cluster management device according to another embodiment of the present disclosure.

On the basis of the embodiment shown in FIG. 3, a detailed structure of the battery cluster management device is also provided by the present disclosure. Reference is made to FIG. 4, which is a structural block diagram of a battery cluster management device according to an embodiment of the present disclosure. Circuit topology of the first DC connecting circuit and the second DC connecting circuit in the embodiment shown in FIG. 3 are provided.

The first DC connecting circuit includes a first soft start circuit and a first connection sampling circuit. The first soft start circuit is connected in series between the first connection sampling circuit and the DC-DC circuit. The first connection sampling circuit is connected to the battery cluster and the integrated controller respectively.

The first soft start circuit includes a diode D1, a resistor R1, and a contactor K13. The first connection sampling circuit includes a first voltage collecting circuit, a first current collecting circuit, a fuse FUSE11, and a fuse FUSE12. An input side of the first voltage collecting circuit is connected in parallel with a side of the first connection sampling circuit close to the battery cluster, and an output side of the first voltage collecting circuit is connected with the integrated controller. The first voltage collecting circuit is configured to collect a DC voltage VA on the side close to the battery cluster. The first current collecting circuit is configured to collect a direct current I between the battery cluster and the DC-DC circuit, and an output side of the first current collecting circuit is connected to the integrated controller.

The second DC connecting circuit includes a second soft start circuit and a second connection sampling circuit. The second soft start circuit is connected in series between the second connection sampling circuit and the DC-DC circuit. The second connection sampling circuit is connected to the battery cluster and the integrated controller respectively.

The second soft start circuit includes a diode D2, a resistor R2, and a contactor K23. The second connection sampling circuit includes a second voltage collecting circuit, a second current collecting circuit, a fuse FUSE21, and a fuse FUSE22. An input side of the second voltage collecting circuit is connected in parallel with a side of the second connection sampling circuit close to the downstream device (that is, the DC-AC conversion device), and an output side of the second voltage collecting circuit is connected with the integrated controller. The second voltage collecting circuit is mainly configured to collect a DC voltage VB on the side close to the downstream device that is connected with the battery cluster.

When the battery cluster is in a state of under-charge and the voltage VB of the second DC connecting circuit satisfies a charging condition: firstly, the integrated controller triggers a contactor K23 to close according to the voltage VB, until an output voltage of the DC-DC circuit reaches the voltage VB stably, the contactor K23 is opened, and a contactor K21 and a contactor K22 are closed simultaneously; secondly, the integrated controller triggers a contactor K13 to close according to the voltage VA, until an input voltage VA of the DC-DC circuit reaches the voltage VB stably, the contactor K13 is opened, and a contactor K11 and a contactor K12 are closed simultaneously.

When the battery cluster is in a fully charged state and the second DC connecting circuit satisfies a discharge condition: firstly, the integrated controller triggers a contactor K13 to close according to the voltage VA, until the input voltage of the DC-DC circuit reaches the voltage VA stably, the contactor K13 is opened, and a contactor K11 and a contactor K12 are closed simultaneously; secondly, the integrated controller triggers a contactor K23 to close according to the voltage VB, until the output voltage of the DC-DC circuit reaches the voltage VA stably, the contactor K23 is opened, and the contactor K21 and the contactor K22 are closed simultaneously.

It should be noted that, the composition of the first voltage collecting circuit, the first current collecting circuit, and the second voltage collecting circuit in the above-mentioned embodiment may be implemented with reference to the voltage collecting circuit and the current collecting circuit in the conventional technology, which is not specifically described herein.

Figure 5:
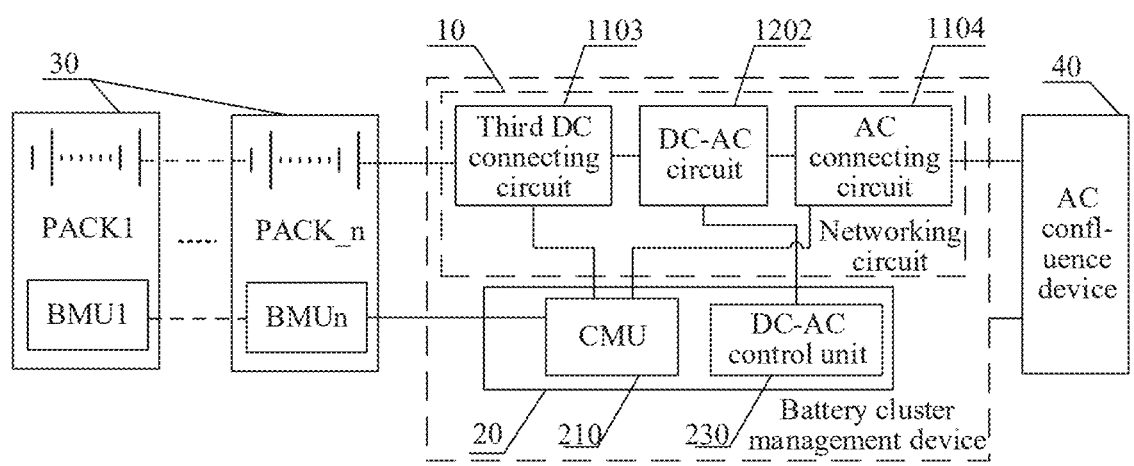
FIG. 5 is a structural block diagram of a battery cluster management device according to another embodiment of the present disclosure.

Reference is made to FIG. 5, which is a structural block diagram of a battery cluster management device according to an embodiment of the present disclosure. On the basis of the embodiment shown in FIG. 2, this embodiment respectively provides configurations of the networking circuit and the integrated controller when the power conversion circuit is a DC-AC circuit. In this embodiment, since the type of the power conversion circuit has been selected, the downstream device 40 described in the embodiment shown in FIG. 2 is an AC confluence device 40 in this embodiment, and the specific structure thereof will be described in detail hereinafter.

Specifically, the connecting circuit 110 includes a third DC connecting circuit 1103 and an AC connecting circuit 1104; the power conversion circuit 120 is a DC-AC circuit 1202 in the embodiment of the present disclosure. The third DC connecting circuit 1103 is connected in series between the battery cluster 30 and the DC-AC circuit 1202, and the AC connecting circuit 1104 is connected in series between the DC-AC circuit 1202 and the AC confluence device 40. Both the third DC connecting circuit 1103 and the AC connecting circuit 1104 are connected to the integrated controller 20.

The integrated controller 20 includes a CMU 210 and a DC-AC control unit 230. The third DC connecting circuit 1103 and the AC connecting circuit 1104 are respectively connected to the CMU 210, the DC-AC circuit 1202 is connected to the DC-AC control unit 230, and the CMU 210 is connected to a BMU in the battery cluster 30.

The third DC connecting circuit 1103 and the AC connecting circuit 1104 are mainly configured to control the connection and disconnection between the DC-AC circuit 1202 and the battery cluster 30, and between the DC-AC circuit 1202 and the AC collection device 40, respectively. The DC-AC circuit 1202 is mainly used for current conversion. The third DC connecting circuit 1103 and the AC connecting circuit 1104 also configured to feed back preset electrical information to the integrated controller 20 like the BMU in the battery cluster 30.

In the battery cluster management device provided by the embodiment in FIG. 5, a circuit of the conventional switch box and a basic circuit of the conventional DC-AC converter are integrated, and corresponding control functions of the above two are integrated into the integrated controller, thereby effectively improving the integration degree of the battery cluster management device and the integration degree of the battery energy storage system.

Figure 6:
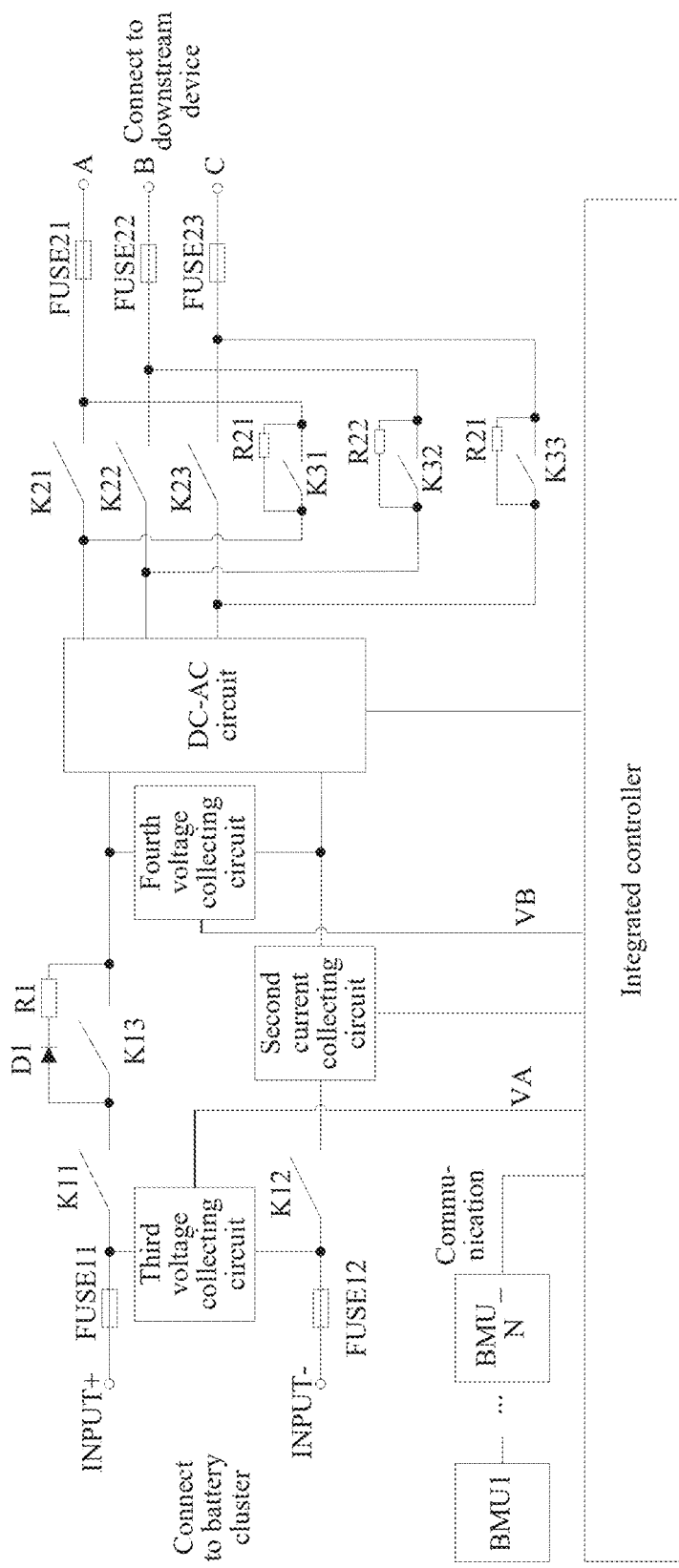
FIG. 6 is a structural block diagram of a battery cluster management device according to another embodiment of the present disclosure.

On the basis of the embodiment shown in FIG. 5, a detailed structure of the battery cluster management device is also provided by the present disclosure. Reference is made to FIG. 6, which is a structural block diagram of a battery cluster management device according to an embodiment of the present disclosure. Circuit topology of the third DC connecting circuit and the AC connecting circuit in the embodiment shown in FIG. 5 are provided.

The third DC connecting circuit includes a third soft start circuit and a third connection sampling circuit. The third soft start circuit is connected in series between the third connection sampling circuit and the DC-AC circuit. The third connection sampling circuit is connected to the battery cluster and the integrated controller respectively.

The third soft start circuit includes a diode D1, a resistor R1, and a contactor K13. The third connection sampling circuit includes a third voltage collecting circuit, a fourth voltage collecting circuit, a second current collecting circuit, a fuse FUSE11, and a fuse FUSE12. An input side of the third voltage collecting circuit is connected in parallel with a side of the third connection sampling circuit close to the battery cluster, and an output side of the third voltage collecting circuit is connected with the integrated controller. The third voltage collecting circuit is mainly configured to collect a DC voltage VA on the side close to the battery cluster. An input side of the fourth voltage collecting circuit is connected in parallel with a side of the third connection sampling circuit close to the DC-AC circuit, and an output side of the fourth voltage collecting circuit is connected with the integrated controller. The fourth voltage collecting circuit is mainly configured to collect a DC voltage VB on the side close to the DC-AC circuit.

The second current collecting circuit is configured to collect a current between the battery cluster and the DC-AC circuit, and an output side of the second current collecting circuit is connected to the integrated controller.

The AC connecting circuit includes a fourth soft start circuit and a three-phase switch. Protective fuses, such as a fuse FUSE21, a fuse FUSE22, and a fuse FUSE23 as shown in FIG. 6 are respectively provided on connection lines corresponding to a phase switch K21, a phase switch K22, and a phase switch K23.

The fourth soft start circuit includes a resistor R21, a resistor R22, a resistor R23, a contactor K31, a contactor K32, and a contactor K33, and the specific connections are shown in FIG. 6.

When the battery cluster is in a fully charged state and the power grid satisfies a discharge condition: firstly, the integrated controller triggers a switch K13 to close according to the voltage VA, until the input voltage of the DC-DC circuit reaches the voltage VA stably, the switch K13 is opened, and a switch K11 and a switch K12 are closed simultaneously; secondly, the integrated controller triggers a switch K23 to close according to the voltage VB, until the output voltage of the DC-DC circuit reaches the voltage VA stably, the switch K23 is opened, and the switch K21 and the switch K22 are closed simultaneously.

When the battery cluster is in a state of under-charge and the power grid satisfies a charging condition: firstly, the integrated controller triggers a switch K31, a switch K32 and a switch K33 to close according to a voltage of the power grid, until a DC voltage of the DC-AC circuit reaches the voltage VB stably, the switches K31, K32 and K33 are opened, and the switches K21, K22 and K23 are closed simultaneously; secondly, the integrated controller triggers a switch K13 to close according to the voltage VA, until an input voltage VA of the DC-AC circuit reaches the voltage VB stably, the switch K13 is opened, and a switch K11 and a switch K12 are closed simultaneously.

It should be noted that, the composition of the third voltage collecting circuit, the fourth voltage collecting circuit and the second current collecting circuit in the above-mentioned embodiment may be implemented with reference to the voltage collecting circuit and the current collecting circuit in the conventional technology, which is not specifically described herein.

A battery energy storage system is provided by the present disclosure on the basis of the battery cluster management device provided in the foregoing embodiments.

Figure 7:
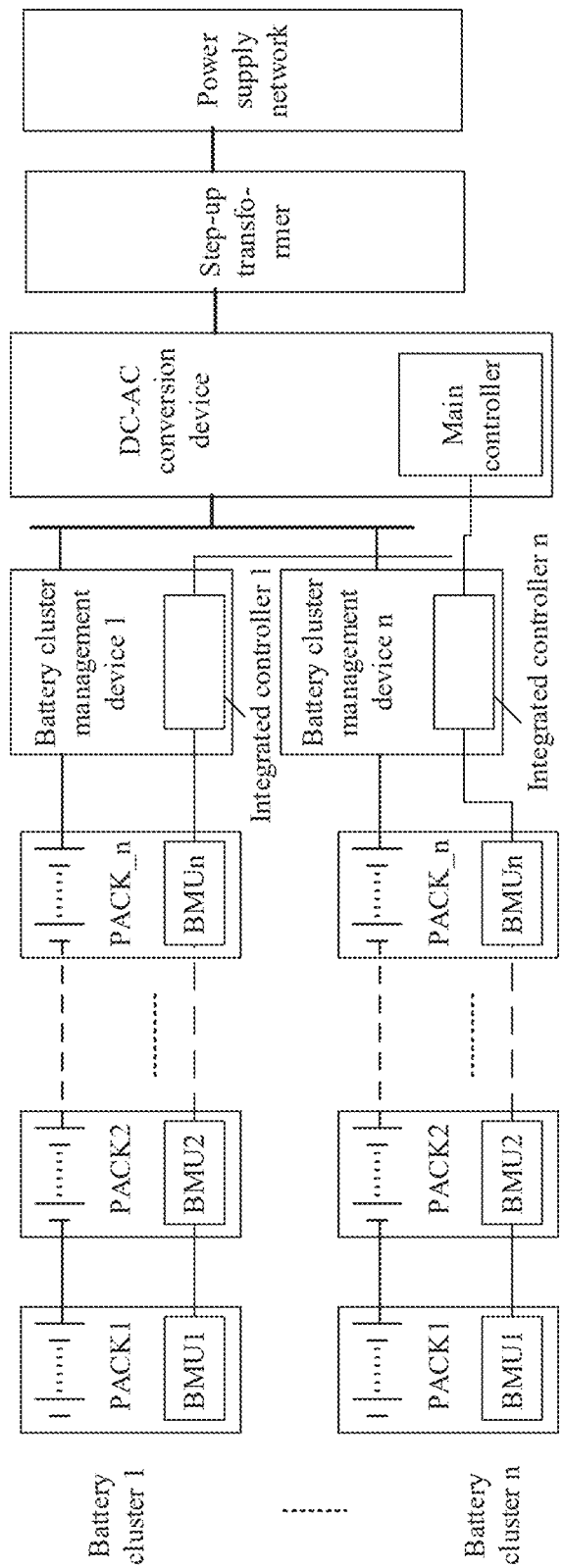
FIG. 7 is a structural block diagram of a battery energy storage system according to an embodiment of the present disclosure.

Reference is made to FIG. 7, which is a structural block diagram of a battery energy storage system according to an embodiment of the present disclosure. In the embodiment, the battery energy storage system includes: at least one battery cluster, a confluence bus, a DC-AC conversion device, and at least one battery cluster management device according to any one of the embodiments as shown in FIGS. 2-4, and the at least one battery cluster is connected with the at least one battery cluster management device.

In practical applications, the number of battery clusters and battery cluster management devices may be selected according to actual conditions of the battery energy storage system. For the connection relationship between the battery cluster and the battery cluster management device, the battery cluster and the battery cluster management device may be set in a one-to-one correspondence, or multiple battery clusters may be connected to the same battery cluster management device, which is not limited herein.

The battery cluster management device is connected to the DC-AC conversion device via the confluence bus, and the DC-AC conversion device is configured to convert the DC current from the confluence bus into the AC current. The DC-AC conversion device is connected to a power supply network, through which the battery energy storage system is connected to the power supply network.

In an embodiment, the DC-AC conversion device includes: a DC-AC circuit and a main controller, the main controller is connected with the DC-AC circuit, and the main controller is configured to: control the DC-AC circuit to perform a preset current conversion process and a preset power control process. That is, the main controller combines the function of the DC-AC circuit with the function of an energy management system (EMS).

In an embodiment, as shown in FIG. 7, the battery energy storage system further includes a step-up transformer configured to control an actual voltage inputted from the battery energy storage system to the power supply network, and the DC-AC conversion device is connected with the power supply network through the step-up transformer.

Figure 8:
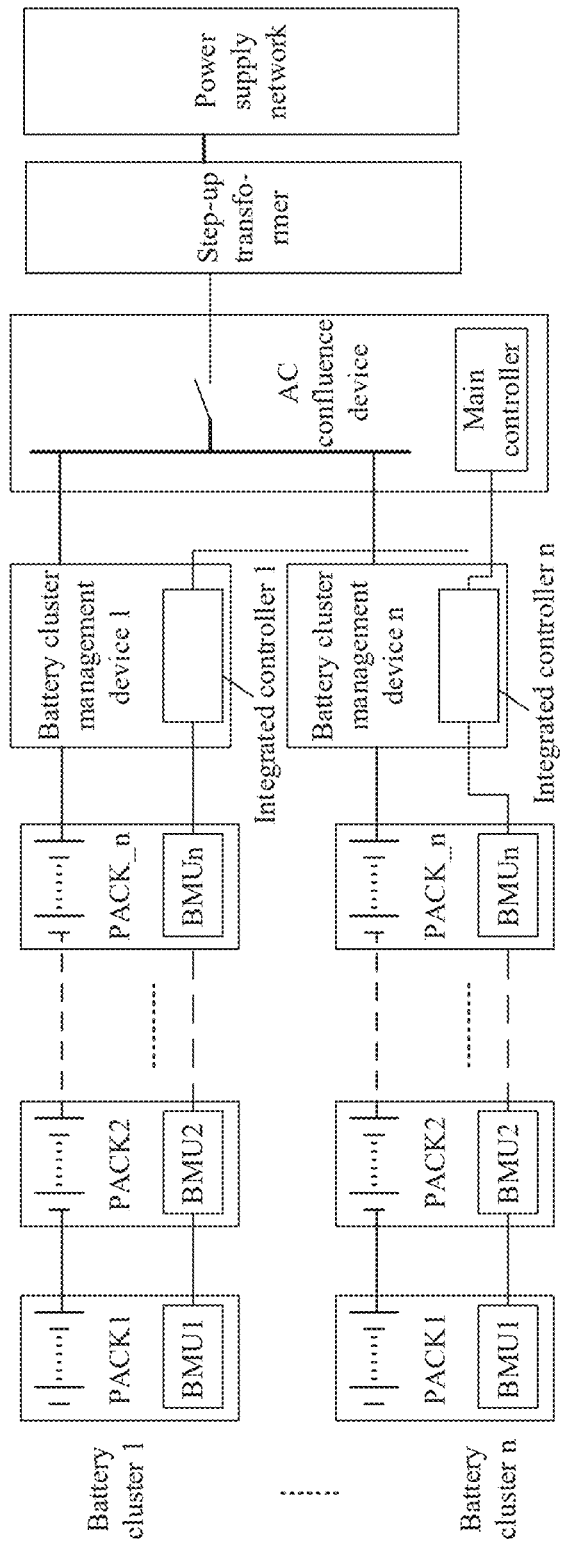
FIG. 8 is a structural block diagram of a battery energy storage system according to another embodiment of the present disclosure.

Reference is made to FIG. 8, which is a structural block diagram of a battery energy storage system according to an embodiment of the present disclosure. In the embodiment, the battery energy storage system includes: at least one battery cluster, an AC confluence device, and at least one battery cluster management device according to any one of the embodiments as shown in FIGS. 2, 5 and 6, and the at least one battery cluster is connected with the at least one battery cluster management device. The number of battery clusters and battery cluster management devices, and the connection relationship between the battery cluster and the battery cluster management device may be implemented with reference to corresponding contents described in the embodiment shown in FIG. 7, which is not repeated herein.

The battery cluster management device is connected to the AC confluence device, and the AC current is converged through the AC confluence device. Further, the AC confluence device is connected to the power supply network, through which the battery energy storage system is connected to the power supply network.

The AC confluence device includes a confluence circuit and a main controller, and the main controller is connected to the confluence circuit. The main controller integrates a confluence grid-connected control unit and an EMS unit. The confluence circuit is controlled by the confluence grid-connected control unit to perform a preset current confluence process, and the EMS unit is configured to perform a preset power control process.

Similar to the embodiment as shown in FIG. 7, the battery energy storage system further includes a step-up transformer, and the AC confluence device is connected with the power supply network through the step-up transformer.

In the embodiments shown in FIGS. 7 and 8, the main controller is similar to the integrated controller in the battery cluster management device, by integrating functions of multiple controllers independently set in the conventional technology, a battery management unit (SMU) in a conventional system is unnecessary, thereby reducing the number of corresponding controllers, effectively reducing the connecting between the controllers, reducing the connecting time of the battery energy storage system, and improving the respond speed to power grid dispatch commands.

The embodiments in this specification are described in a progressive manner. For the same or similar parts between the embodiments, one may refer to the description of other embodiments. Each embodiment lays emphasis on differences from other embodiments. Since the system embodiment is similar to the method embodiment, the description for the system embodiment is relatively simple. For related parts, reference may be made to description in the method embodiment.

The above embodiments are preferred embodiments of the present disclosure and are not intended to limit the scope of the present disclosure. It should be understood that, for those skilled in the art, alternations, modifications or equivalent substitutions may be made to the technical solutions of the present disclosure according to the methods and technical solutions above without departing from the scope of the technical solutions of the present disclosure. These alternations, modifications or equivalent substitutions made according to the technical essence of the present disclosure fall within the protection scope of the present disclosure.

The invention claimed is:

1. A battery cluster management device, comprising: a networking circuit and an integrated controller, wherein
    the networking circuit comprises a connecting circuit and a power conversion circuit connected in series;
    the integrated controller is connected to the connecting circuit, the power conversion circuit, and a battery management unit (BMU) in a battery cluster, respectively;
    the integrated controller is configured to: perform a preset battery management process according to preset electrical information fed back by the connecting circuit and the BMU, and control the power conversion circuit to perform a preset current conversion process;
    the integrated controller comprises a battery cluster management unit (CMU);
    the power conversion circuit comprises a direct current to alternating current (DC-AC) circuit or a direct current to direct current (DC-DC) circuit;
    wherein in a case that the power conversion circuit comprises the DC-DC circuit, the connecting circuit comprises a first direct current (DC) connecting circuit and a second DC connecting circuit, the first DC connecting circuit is connected in series between the battery cluster and the DC-DC circuit, the second DC connecting circuit is connected in series between the DC-DC circuit and a DC-AC conversion device, and the first DC connecting circuit and the second DC connecting circuit are connected with the integrated controller, respectively.

2. The battery cluster management device according to claim 1, wherein
    the first DC connecting circuit comprises a first soft start circuit and a first connection sampling circuit, the first soft start circuit is connected in series between the first connection sampling circuit and the DC-DC circuit, and the first connection sampling circuit is connected with the battery cluster and the integrated controller, respectively;
    and the second DC connecting circuit comprises a second soft start circuit and a second connection sampling circuit, the second soft start circuit is connected in series between the DC-DC circuit and the second connection sampling circuit, and the second connection sampling circuit is connected with the DC-AC conversion device and the integrated controller, respectively.

3. The battery cluster management device according to claim 1, wherein the integrated controller further comprises a DC-DC control unit.

4. The battery cluster management device according to claim 1, wherein in a case that the power conversion circuit comprises the DC-AC circuit, the connecting circuit comprises a third direct current (DC) connecting circuit and an alternating current (AC) connecting circuit, wherein
    the third DC connecting circuit is connected in series between the battery cluster and the DC-AC circuit;
    the AC connecting circuit is connected in series between the DC-AC circuit and an AC confluence device; and
    the third DC connecting circuit and the AC connecting circuit are connected with the integrated controller, respectively.

5. The battery cluster management device according to claim 4, wherein the third DC connecting circuit comprises a third soft start circuit and a third connection sampling circuit, wherein
    the third soft start circuit is connected in series between the third connection sampling circuit and the DC-AC circuit; and
    the third connection sampling circuit is connected with the battery cluster and the integrated controller, respectively.

6. The battery cluster management device according to claim 4, wherein the integrated controller further comprises a DC-DC control unit.

7. A battery energy storage system, comprising:
    at least one battery cluster;
    a confluence bus;
    a direct current to alternating current (DC-AC) conversion device; and
    at least one battery cluster management device, wherein the at least one battery cluster management device comprises a networking circuit and an integrated controller, wherein
    the networking circuit comprises a connecting circuit and a power conversion circuit connected in series;
    the integrated controller comprises a battery cluster management unit (CMU) and is connected to the connecting circuit, the power conversion circuit, and a battery management unit (BMU) in a battery cluster, respectively;
    the integrated controller is configured to: perform a preset battery management process according to preset electrical information fed back by the connecting circuit and the BMU, and control the power conversion circuit to perform a preset current conversion process;
    the power conversion circuit comprises a direct current to direct current (DC-DC) circuit, the connecting circuit comprises a first direct current (DC) connecting circuit and a second DC connecting circuit, the first DC connecting circuit is connected in series between the battery cluster and the DC-DC circuit, the second DC connecting circuit is connected in series between the DC-DC circuit and a DC-AC conversion device, and the first DC connecting circuit and the second DC connecting circuit are connected with the integrated controller, respectively;

the at least one battery cluster is connected with the at least one battery cluster management device;

the at least one battery cluster management device is connected with the DC-AC conversion device via the confluence bus; and the DC-AC conversion device is connected with a power supply network.

8. The battery energy storage system according to claim 7, wherein the DC-AC conversion device comprises: a DC-AC circuit and a main controller, wherein the main controller is connected with the DC-AC circuit; and the main controller is configured to: control the DC-AC circuit to perform the preset current conversion process and a preset power control process.

9. The battery energy storage system according to claim 7, wherein the battery energy storage system further comprises a step-up transformer, and the DC-AC conversion device is connected with the power supply network through the step-up transformer.

10. The battery energy storage system according to claim 7, wherein the first DC connecting circuit comprises a first soft start circuit and a first connection sampling circuit, the first soft start circuit is connected in series between the first connection sampling circuit and the DC-DC circuit, and the first connection sampling circuit is connected with the battery cluster and the integrated controller, respectively; and the second DC connecting circuit comprises a second soft start circuit and a second connection sampling circuit, the second soft start circuit is connected in series between the DC-DC circuit and the second connection sampling circuit, and the second connection sampling circuit is connected with the DC-AC conversion device and the integrated controller, respectively.

11. The battery energy storage system according to claim 7, wherein the integrated controller further comprises a DC-DC control unit.

12. A battery energy storage system, comprising:
at least one battery cluster;
an alternating current (AC) confluence device;
at least one battery cluster management device, wherein the at least one battery cluster management device comprises a networking circuit and an integrated controller, wherein the networking circuit comprises a connecting circuit and a power conversion circuit connected in series;

the integrated controller comprises a battery cluster management unit (CMU) and is connected to the connecting circuit, the power conversion circuit, and a battery management unit (BMU) in a battery cluster, respectively;

the integrated controller is configured to: perform a preset battery management process according to preset electrical information fed back by the connecting circuit and the BMU, and control the power conversion circuit to perform a preset current conversion process;

the power conversion circuit comprises a direct current to alternating current (DC-AC) circuit, the connecting circuit comprises a third direct current (DC) connecting circuit and an AC connecting circuit, the third DC connecting circuit is connected in series between the battery cluster and the DC-AC circuit, the AC connecting circuit is connected in series between the DC-AC circuit and an AC confluence device, and the third DC connecting circuit and the AC connecting circuit are connected with the integrated controller, respectively;

the at least one battery cluster is connected with the at least one battery cluster management device;

the at least one battery cluster management device is connected with the AC confluence device; and the AC confluence device is connected with a power supply network.

13. The battery energy storage system according to claim 12, wherein the AC confluence device comprises a confluence circuit and a main controller, wherein the main controller is connected with the confluence circuit; and the main controller is configured to: control the confluence circuit to perform a preset current confluence process and a preset power control process.

14. The battery energy storage system according to claim 12, wherein the battery energy storage system comprises a step-up transformer, and the AC confluence device is connected with the power supply network through the step-up transformer.

15. The battery energy storage system according to claim 12, wherein the third DC connecting circuit comprises a third soft start circuit and a third connection sampling circuit, wherein the third soft start circuit is connected in series between the third connection sampling circuit and the DC-AC circuit; and the third connection sampling circuit is connected with the battery cluster and the integrated controller, respectively.

16. The battery energy storage system according to claim 12, wherein the integrated controller further comprises a DC-DC control unit.

* * * * *